United States Patent
Rausch

(10) Patent No.: US 9,672,845 B2
(45) Date of Patent: Jun. 6, 2017

(54) ADJACENT TRACK INTERFERENCE ASYMMETRY MITIGATION

(71) Applicant: Seagate Technology LLC, Cupertino, CA (US)

(72) Inventor: Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/833,342

(22) Filed: Aug. 24, 2015

(65) Prior Publication Data

US 2016/0148630 A1    May 26, 2016

Related U.S. Application Data

(60) Provisional application No. 62/083,696, filed on Nov. 24, 2014, provisional application No. 62/083,732, filed on Nov. 24, 2014.

(51) Int. Cl.

| G11B 5/56 | (2006.01) |
|---|---|
| G11B 5/09 | (2006.01) |
| G11B 5/012 | (2006.01) |
| G11B 20/18 | (2006.01) |
| G11B 11/105 | (2006.01) |
| G11B 5/00 | (2006.01) |
| G11B 20/12 | (2006.01) |
| G11B 5/596 | (2006.01) |

(52) U.S. Cl.
CPC .............. *G11B 5/09* (2013.01); *G11B 5/012* (2013.01); *G11B 20/1217* (2013.01); *G11B 20/1833* (2013.01); *G11B 5/59633* (2013.01); *G11B 5/59638* (2013.01); *G11B 11/10506* (2013.01); *G11B 11/10515* (2013.01); *G11B 11/10521* (2013.01); *G11B 11/10595* (2013.01); *G11B 20/12* (2013.01); *G11B 2005/0021* (2013.01); *G11B 2020/1222* (2013.01); *G11B 2020/1238* (2013.01)

(58) Field of Classification Search
None
See application file for complete search history.

(56) References Cited

U.S. PATENT DOCUMENTS

| 4,030,130 A | 6/1977 | Smith |
| 4,298,897 A | 11/1981 | Arter et al. |
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |

(Continued)

FOREIGN PATENT DOCUMENTS

| EP | 0484774 A2 | 5/1992 |
| EP | 1564736 | 8/2005 |

(Continued)

*Primary Examiner* — K. Wong
(74) *Attorney, Agent, or Firm* — Holzer Patent Drennan

(57) ABSTRACT

A storage device includes a controller that selects an offset when preparing to write data to a target data track. The offset defines a position for a write head relative to a center of the target track and is selected based on a radial position of a write head at the target data track.

20 Claims, 4 Drawing Sheets

(56) References Cited

U.S. PATENT DOCUMENTS

| | | | |
|---|---|---|---|
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A * | 4/1999 | Ito | G11B 5/553 360/48 |
| 5,978,168 A * | 11/1999 | Mathews | G11B 5/4886 360/76 |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 * | 10/2008 | Nakamura | G11B 5/59627 360/77.04 |
| 7,573,682 B2 | 8/2009 | Pust et al. | |
| 7,872,829 B2 * | 1/2011 | Sakai | G11B 5/5526 360/77.02 |
| 7,907,360 B2 | 3/2011 | Mak et al. | |
| 7,957,093 B2 | 6/2011 | Brand | |
| 7,965,465 B2 | 6/2011 | Sanvido et al. | |
| 8,023,215 B1 | 9/2011 | Ghaly et al. | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 * | 10/2014 | Jin | G11B 27/36 360/31 |
| 8,867,161 B2 | 10/2014 | Emo et al. | |
| 8,873,178 B2 | 10/2014 | Erden et al. | |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 | 8/2015 | Zhou et al. | |
| 9,111,578 B1 | 8/2015 | Hassel et al. | |
| 9,129,658 B1 * | 9/2015 | Yamamoto | G11B 27/36 |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 * | 8/2016 | Rausch | G11B 5/4886 |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki et al. | |
| 2015/0178161 A1 | 6/2015 | Burd et al. | |
| 2016/0148046 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | 02240862 A | 9/1990 |
| WO | 2005-030869 A1 | 4/2005 |

* cited by examiner

ADJACENT TRACK INTERFERENCE ASYMMETRY MITIGATION

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. Both of these applications are specifically incorporated by reference for all that they disclose or teach.

BACKGROUND

In magnetic recording devices, adjacent track interference (ATI) is encountered when a target data track on a magnetic recording medium is written a large number of times without adjacent tracks being written to. Over time, data writes to the target data track may degrade or corrupt data on the adjacent tracks. Modern devices utilize a number of mechanisms to mitigate data corruption due to ATI including, for example, utilization of write counters that trigger periodic read scans and/or data re-writes to fix corrupted data before it becomes irreparably damaged.

BRIEF DESCRIPTIONS OF THE DRAWINGS

SUMMARY

Implementations disclosed herein provide for a storage device controller configured to position a write head at an offset from a center of a target data track for a data write to the target data track, the offset selected based on a radial position of the write head at the target data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Interlaced Magnetic Recording (IMR) is a write technique that significantly reduces ATI concerns. In IMR systems, data may be written to alternating (e.g., every other) data track on a storage medium for a period of time as storage medium is filled, such as until a set capacity condition is satisfied. For this period of time when no data is written to a series of tracks interlaced with the alternating data tracks, the risk of ATI is eliminated. This risk is resumed when data is eventually written to the interlaced data tracks; however, this risk is then limited to an identifiable subset of data tracks on the storage medium. To further improve IMR system performance, better controls for monitoring, correcting, and mitigating ATI are desired.

Figure 1:
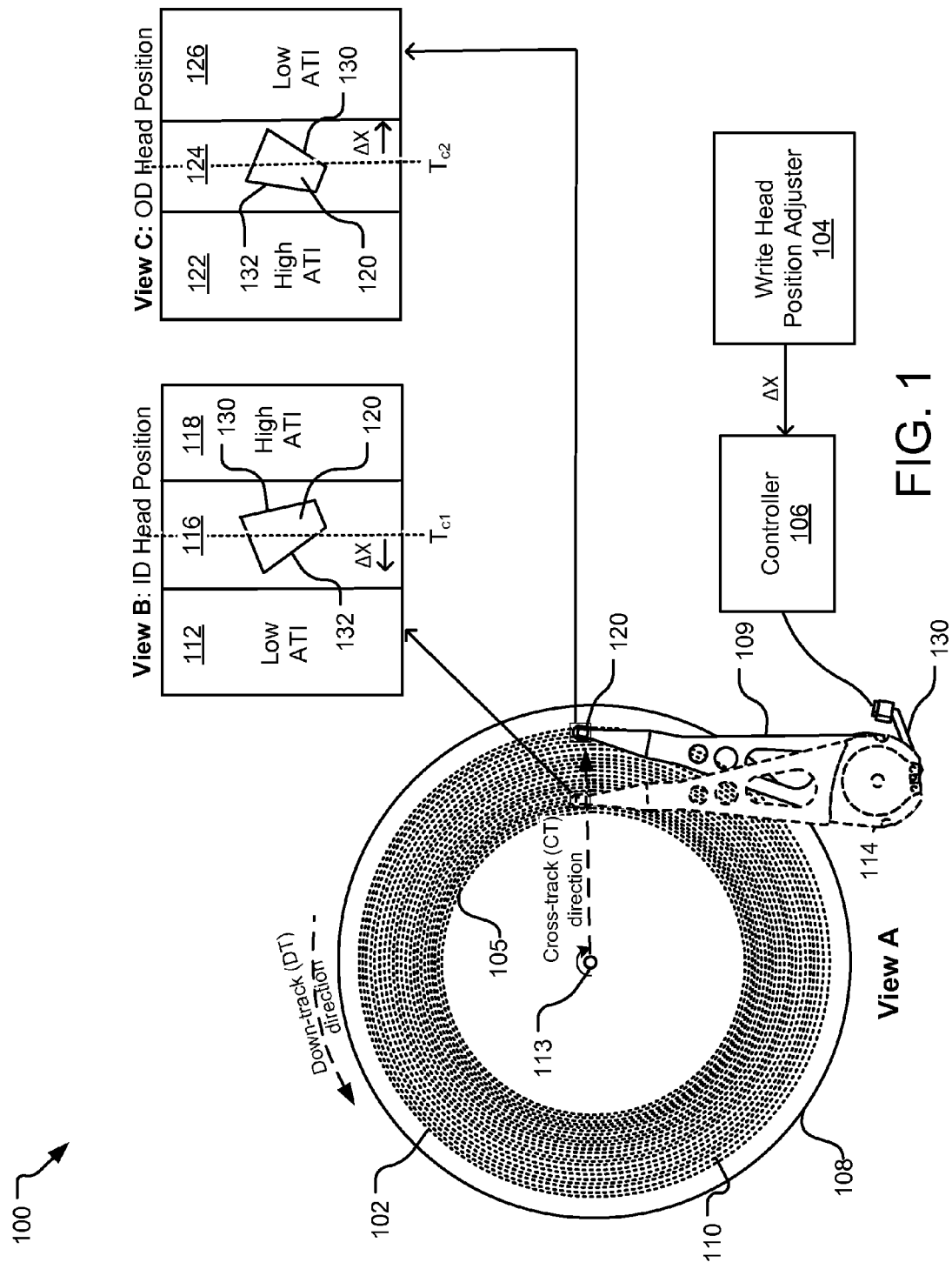
FIG. 1 illustrates an example data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 113 during rotation, and includes an inner diameter 105 (i.e., the "ID") and an outer diameter 102 (i.e., the "OD") between which are a number of concentric data tracks 110. Information may be written to and read from data bit locations in the data tracks on the magnetic storage medium 108.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 114. The seek operation positions the transducer head assembly 120 over the target data track (e.g., the data tracks 110) for read and write operations.

The transducer head assembly 120 includes at least one write element (not shown) that further includes a write pole for converting a series of electrical pulses sent from a storage device controller 106 into a series of magnetic pulses of commensurate magnitude and length. The magnetic pulses of the write pole selectively magnetize magnetic grains of the rotating magnetic storage medium 108 as they pass below the pulsating write element.

The storage device controller 106 implements write commands and controls positioning of the transducer head assembly 120. The storage device controller 106 includes software and/or hardware, and may be implemented in any tangible computer-readable storage media within or communicatively coupled to the data storage device 100. As used herein, the term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

FIG. 1 illustrates the actuator assembly 109 at first and second positions (e.g., solid and broken lines). Views B and C illustrate the transducer head assembly 120 at the first and second positions, respectively, relative to the magnetic storage medium 108. View B and C illustrate one challenge in monitoring and correcting adjacent track interference (ATI), which is described in greater detail below.

In general, adjacent track interference (ATI) (also referred to as adjacent track erasure) occurs when a same target data track is written to multiple times and the immediately adjacent data tracks are not re-written. Over time, stray magnetic field from the write element can cause data corruption or data loss on tracks immediately adjacent to a data track that is rewritten multiple times. To track and repair ATI, the storage device controller 106 keeps a write counter in association with some or all data tracks on the magnetic storage medium 108. In one implementation, the controller 106 increments a write counter for a data track each time an immediately adjacent data track is written to. When the write counter reaches a threshold for a particular data track, the controller 106 initiates a direct offline scan (DOS) of the corresponding data track. A DOS, also referred to as a defective data scan, measures data track degradation. During the DOS, data is read back from a data track and a number of correctable read errors are counted. Correctable read errors may be detected, for example, by parity bits and error correction code designed to correct up to a threshold number of errors on a data track. If the number of correctable read errors exceeds a threshold, the storage device controller may elect to re-write the data of that data track before the data degradation worsens and becomes irreparable.

One challenge in managing write counters for DOS scans is that observed ATI degradation per number of data writes is not uniform across the magnetic storage medium 108. This effect is due to a skew angle of the transducer head 120, which varies at different radial positions of the transducer head 120 (as shown in View B and View C).

Radial motion of the actuator assembly 109 causes a variation in skew angle, or the angle between a longitudinal axis of the transducer head assembly 120 and a tangent to each underlying data track. In View B, the transducer head assembly 120 is shown writing to a target data track 116 that is located proximal to an inner diameter of the magnetic storage medium 108. At the inner diameter position, an inner edge 132 of the transducer head assembly 120 is angled relative to a target data track center ($T_{c1}$) and toward an ID-side adjacent track 112 on the inner diameter side. This angling of the transducer head assembly 120 causes ATI to occur more quickly on an OD-side adjacent track 118 than on an ID-side adjacent track 112 over a duration of repeated writes to the target data track 116. This is attributable, in part, to the fact that an edge of the transducer head assembly 120 is substantially straight relative to the OD-side adjacent track 118, which corresponds to an increase in write field on the OD-side adjacent track 118 as compared to the ID-side adjacent track 112.

When the transducer head 120 is writing to a target data track 124 located proximal to an outer diameter of the magnetic storage medium 108, as shown in View C, the opposite effect is observed. Here, the outer edge 130 of the transducer head assembly 120 is angled relative to a target data track center $T_{c2}$ and toward an OD-side adjacent track 126. This angling of the transducer head assembly 120 causes ATI to occur more quickly on an ID-side adjacent track 122 than on an OD-side adjacent track 126 over a duration of repeated writes to the target data track 124.

As described above, performance loss (e.g., degradation due to ATI, also referred to herein as "ATI degradation") is observed differently at both inner diameter and outer diameter target track positions. In addition, the magnitude of observed ATI on the OD-side adjacent track and the ID-side adjacent track varies across a range of target tracks on the magnetic storage medium 108. For example, ATI is less severe in regions of the magnetic storage medium 108 corresponding to low skew angles of the transducer head 120 than in regions corresponding to higher skew angles. These variances complicate DOS management. For example, it may be desirable to trigger DOS scans on some data tracks at a lower write count threshold than for other data tracks because some tracks may degrade more quickly as a result of ATI than other tracks.

To simplify the management of DOS scans and ATI correction, it is desirable to "even out" the ATI across the surface of the magnetic storage medium 108 so that a single write track counter threshold may be used to uniformly trigger DOS for all positions of the transducer head assembly 120. Solutions to this challenge (described below) are primarily contemplated for implementation within an Interlaced Magnetic Recording (IMR) system. However, there may exist other types of magnetic recordings systems for which the disclosed technology is equally applicable. Although specific IMR techniques are not shown or disclosed with respect to FIG. 1, the data storage device 100 is, in one implementation, an IMR system.

To effectively "even out" the ATI across the magnetic storage medium 108, the data storage device 100 includes a write head position adjuster 104 that determines (e.g., looks up or calculates) a transducer head assembly 120 position adjustment for write operations to a predefined subset of data tracks on the magnetic storage medium 108, such as a subset of tracks dispersed from one another in a uniform manner.

Responsive to receipt of a write command from either the storage device controller 106 or a host device (not shown), the write head position adjuster 104 determines whether a target track belongs to the predefined subset of tracks for which a write position adjacent is to be performed. If the target data track belongs to the predefined subset of tracks, the write head position adjuster 104 retrieves a radial offset ($\Delta x$) indicative of a distance by which to offset the longitudinal axis of the transducer head assembly 120 from a track center (e.g., $T_{c1}$ or $T_{c2}$ in View B and View C) during a write operation to the target data track (e.g., 116 or 124, respectively). The radial offset ($\Delta x$) may be retrieved, for example, from a look-up table storing offsets corresponding to each of a number of radial positions of the transducer head assembly 120. The offset ($\Delta x$) may vary in direction and also in magnitude depending on the position of the target data track 116 or 124, respectively (e.g., corresponding to the skew angle of the transducer head assembly 120).

For example, when writing to the target data track 116 at the inner diameter position illustrated in View B, the write head position adjuster 104 instructs the storage device controller 106 to shift the transducer head assembly 120 toward the inner diameter by the radial offset $\Delta x$, which has the effect of increasing ATI on the ID-side adjacent track 112 but decreasing ATI on the OD-side adjacent track 118, effectively evening out the rate of observed ATI on the two tracks over repeated writes to the target data track 116.

When writing to the target data track 124 at the outer diameter position illustrated in View C, the write head position adjuster 104 instructs the controller 106 to shift the transducer head assembly 120 toward the outer diameter by the offset of $\Delta x$ for the write operation. This position shift has the effect of increasing ATI on the track OD-side adjacent track 126 and decreasing ATI on the ID-side adjacent track 122, effectively evening out the rate of observed ATI on the two tracks over repeated writes to the target data track 124.

In one implementation, the above-described offset $\Delta x$ is retrieved and utilized exclusively for data writes to alternating data tracks on the storage medium. Nuances of this methodology are discussed in greater detail with respect to FIG. 2 below.

Figure 2:
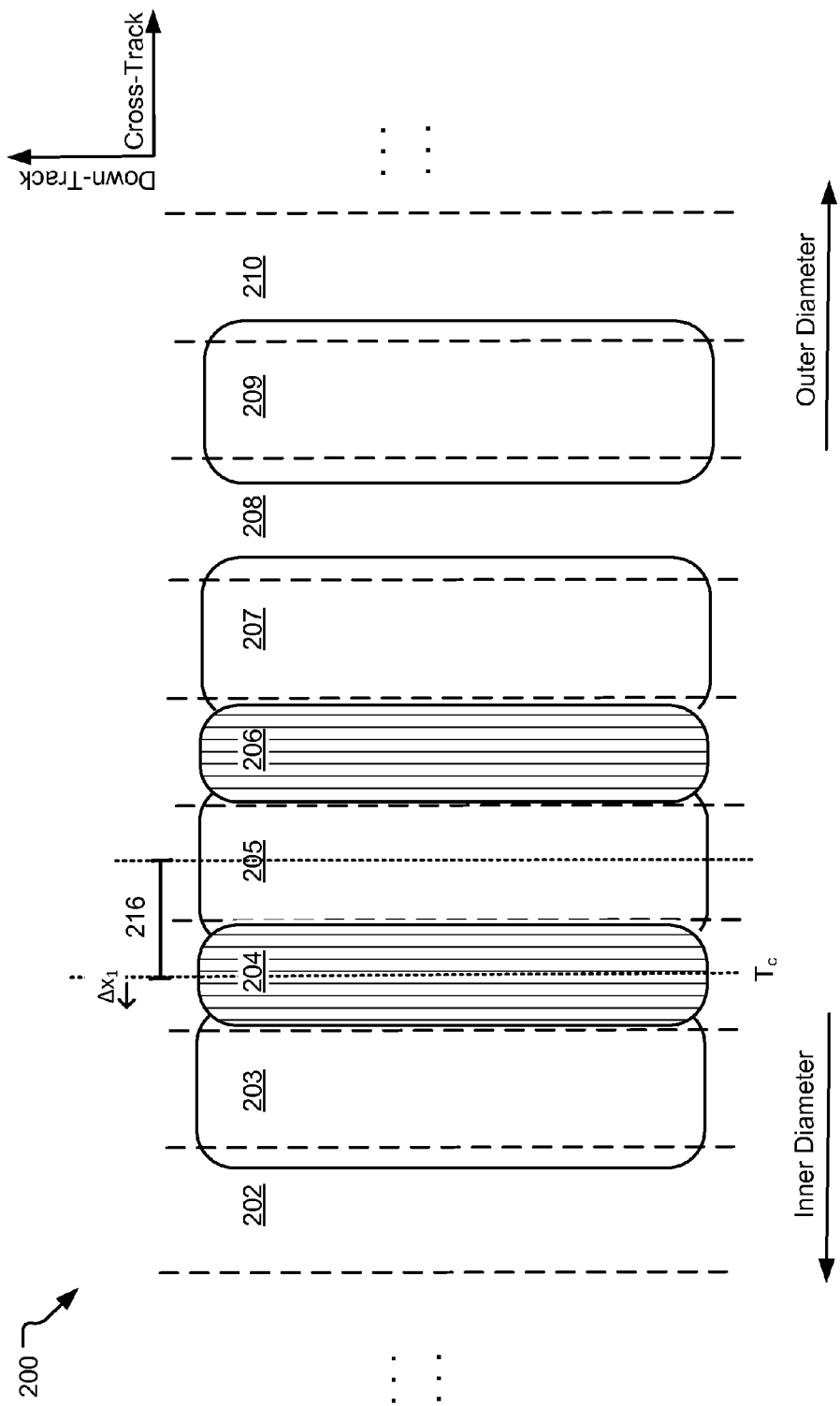
FIG. 2 illustrates a portion of a magnetic medium in an example IMR system suitable for applying techniques to increase ATI uniformity.

FIG. 2 illustrates a portion of a magnetic medium 200 in an example IMR system suitable for applying techniques to increase ATI uniformity. The magnetic medium 200 includes a number of substantially circular data tracks (e.g., data tracks 202-210). Of the tracks 202-210, alternating data tracks have different written track widths and are arranged with slightly overlapping written track boundaries so that a center-to-center distance between directly adjacent tracks (e.g., a track pitch 216) is uniform across the illustrated region of the magnetic medium 200. In FIG. 2, a first series of alternating tracks (e.g., data tracks 203, 205, 207, and 209) have a wider written track width than a second series of data tracks (e.g., 202, 204, 206, etc.) interlaced with the first series.

On the magnetic medium 200, each wide data track of the first series (e.g., 203, 205, 207, etc.) is written before the directly adjacent and narrower written data tracks of the second series (e.g., 202, 204, 206, etc.). For example, the data track 205 is written before data is written to either of the data tracks 204 or 206. Data writes to the data tracks 204 and 206 overwrite outer edge portions of the data track 205; however, the data track 205 is still readable due to sufficient information retained in a center region of the data track.

Because each data track of wide written track width is written prior to its directly adjacent data tracks of narrower written track width, the data tracks of the wider written track width (e.g., data tracks 203, 205, 207 and 209) are also referred to herein as "bottom tracks," while the alternating data tracks of narrower written width (e.g., data tracks 204 and 206) are referred to herein as "top tracks." In one implementation, the bottom tracks of wider written track width include data stored at a higher linear density than the top tracks of narrower written track width.

Variability in written track width can be accomplished differently in different types of recording systems, such as by varying laser power in a heat assisted magnetic recording (HAMR) system or by writing data with multiple read elements of different sizes in a traditional perpendicular magnetic recording system. By manipulating written track width of various tracks, linear densities of various data tracks, and in an order in which the various data tracks are written, a storage system can be tuned to exhibit areal densities and/or performance benefits superior to other types of magnetic recording.

In one implementation, a system controller directs incoming data writes exclusively to the bottom tracks (e.g., 203, 205, 207, 209, etc.) of the storage medium 200 for a period of time as the magnetic medium 200 begins to fill up with data. Once a capacity condition is satisfied, the controller begins directing incoming data to the top tracks (e.g., 204, 206, etc.). A capacity condition may be, for example, a total data capacity of the magnetic storage medium or of a radial zone on the medium including the data tracks 202-210. For example, the storage device controller may write data exclusively to the first series of alternating data tracks (203, 205, 207, etc.) so long as less than 50% of the data tracks on the storage medium 200 (or within a defined radial zone) store data. In other implementations, other capacity conditions may be applied.

One advantage to writing data exclusively to alternating data tracks for a period of time is that a risk of ATI is substantially eliminated so long as the top data tracks do not store any data. As the magnetic medium 200 fills up, however, the storage device controller eventually begins directing data to the top data tracks (e.g., 204, 206, 208), and the risk of ATI is realized. For example, repeated writes to the data track 204 may cause some ATI on the directly adjacent data-storing tracks 203 and 205.

Once the controller begins directing data to the top data tracks (e.g., 204, 206, 208, etc.), more advanced data management techniques may be implemented, such as various different techniques governing the read and write order of the data tracks. In one implementation, the top data tracks are writable at random, without writing data of any other track. In contrast, a re-write or modification to a bottom track, such as the track 205, may entail reading and/or writing of multiple tracks. For example, re-writing the data track 205 may entail the following operations in the following order (1) reading the top data tracks 204 and 206 into memory; (2) writing the data track 205; and (3) re-writing the top data tracks 204 and 206. Other data management techniques may be used in other implementations.

As discussed with respect to FIG. 1, a rate of ATI degradation may vary across the surface of the magnetic medium 200 between an inner diameter (ID) region and an outer diameter (OD) region. If, for example, the data track 206 is located in an outer diameter (OD) region of the magnetic medium 200, repeated data writes to the top track 206 may lead to greater ATI on the data track 205 (referred to below as the "ID-side adjacent data track 205") than on the data track 207 (referred to below as the "OD-side adjacent data track 207"). If, on the other hand, the data track 206 is located in an inner diameter region of the magnetic storage medium 200, repeated data writes to the top data track 206 may lead to the reverse effect—greater ATI on the OD-side adjacent data track 207 than on the ID-side adjacent data track 205.

To even out the rate of ATI degradation across the surface of the magnetic medium 200, a controller of the storage device applies an offset position adjustment to a write element whenever data is written to one of the top data tracks (e.g., the tracks 204, 206, 208, etc.) In one implementation, the controller selects the offset based on the radial position of the write element at the target data track. For example, the controller accesses a look-up table (not shown) including a plurality of offset values each corresponding to a different radial position of the write element (e.g., a different one of the top data tracks). Values of the offset may vary in direction and magnitude across the range of radial potential radial positions of the write element.

In FIG. 2, the track center line $T_c$ of data track 204 illustrates an exemplary position of the write element when no write position offset is applied. In an implementation where the illustrated data tracks 202-210 are located in an inner diameter zone of the magnetic storage medium 200, a select write offset may be applied to one or more top data tracks in a direction toward the inner diameter of the magnetic storage medium 200, as denoted by the arrow below the illustrated offset $\Delta x_1$ in FIG. 2. Rather than place the write element on the track center line $T_c$ to write data to the data track 204, the storage device controller positions the write element at a position $T_c + \Delta x_1$. A consequence of the direction and magnitude of the offset $\Delta x_1$ is that observed ATI degradation is relatively equal between data tracks 203 and 205 after a number of repeated data writes to the data track 204.

If, on the other hand, the illustrated data tracks 202-210 are located in an outer diameter zone of the magnetic storage medium 200, the direction of the selected shift $\Delta x_1$ may be opposite that shown in FIG. 2 and toward an outer diameter of the magnetic storage medium 200 to deliver the same net effect of evening out observed ATI degradation between the data tracks 203 and 205 after a number of repeated data writes to the data track 204.

Further, the magnitude of the select offset corresponding to each of the top data tracks (e.g., 204, 206, etc.) may also be variable based on the radial position of the data track. For example, top data tracks corresponding to greatest skew angle (e.g., ID and OD zones) may correspond to the largest magnitude shifts, while top tracks corresponding to smallest skew angle (e.g., middle diameter zones) may correspond to the smallest magnitude shifts. A result of these variable magnitude shifts is that the observable ATI can be evened out across the entire surface of the magnetic storage medium 200.

In one implementation, the above-described write head adjustment is performed exclusively for the top data tracks (e.g., 204, 206, etc.), and the write head is aligned with a track center when writing data to the bottom data tracks (e.g., 203, 205, 207, etc.).

Figure 3:
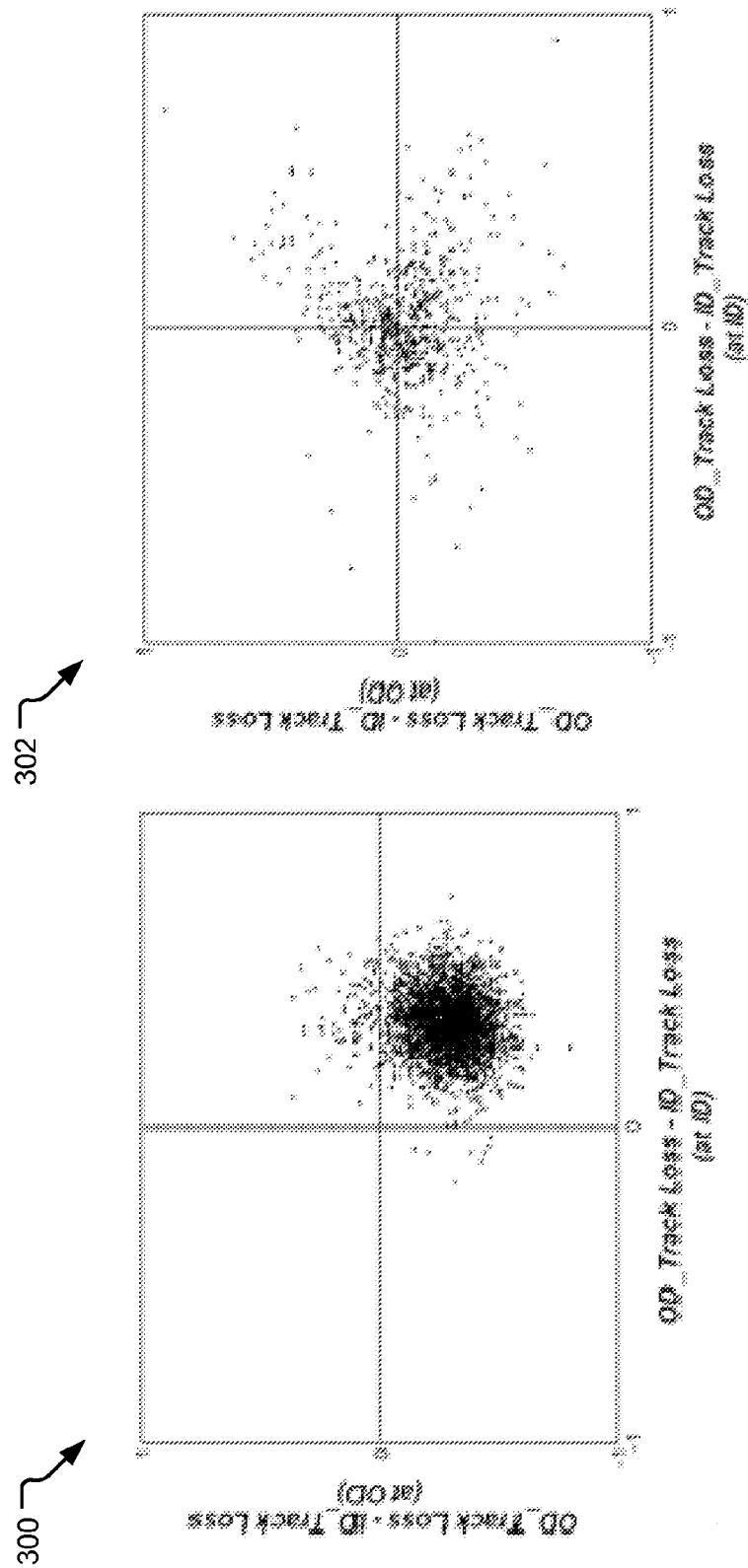
FIG. 3A illustrates an example plot indicating the asymmetric nature of ATI in a perpendicular magnetic recording system when writing is performed at the outside and inside radius of a disc.
FIG. 3B illustrates an example plot indicating the symmetric nature of ATI in another type of magnetic recording system when writing is performed at the outside and inside radius of a magnetic disc.

FIG. 3A illustrates a plot 300 indicating the asymmetric nature of ATI in a perpendicular magnetic recording systems when writing is performed at the outside and inside radius of the disk. Each point on the plot 300 represents performance measurements for a different write head. The horizontal axis represents a performance measurement taken for the write head at first data track near the OD (the "OD test track") of the disk and the vertical axis represents a performance measurement taken for the write head at a second data track near the ID of the disk (the "ID test track").

The performance measurement taken at each of the OD test track and the ID test track for each of the different write heads is a quantification of performance loss (e.g., ATI degradation) between the two directly adjacent tracks (e.g., an OD-side adjacent track and an ID-side adjacent track") over repeated data writes to the center track (e.g., the OD test track or the ID test track).

Since heavier ATI degradation is observable on the ID-side adjacent track when writing to the OD test track, values along the horizontal axis tend to assume negative values. In contrast, heavier ATI degradation is observable on the OD-side adjacent track when writing to the ID-zone test track. Therefore, values along the vertical axis tend to assume positive values.

FIG. 3B illustrates a plot 302 indicating a symmetric nature of ATI in another type of magnetic recording system when writing is performed at the outside and inside radius of a magnetic disc. Specifically, the data on plot 302 was collected for a variety of HAMR write heads. In FIG. 3B, the horizontal axis and vertical axis represent the same measurements as those in FIG. 3A. Notably, a cluster "center" of plotted data hovers nearer to the origin in the plot 302 than in the plot 300. This is because ATI does not depend on skew in HAMR systems. According to one implementation of the disclosed technology, a result identical or substantially similar to plot 302 can be observed using the selective write offset techniques disclosed above with respect to FIGS. 1-2 to mitigate the asymmetric effects of ATI.

Figure 4:
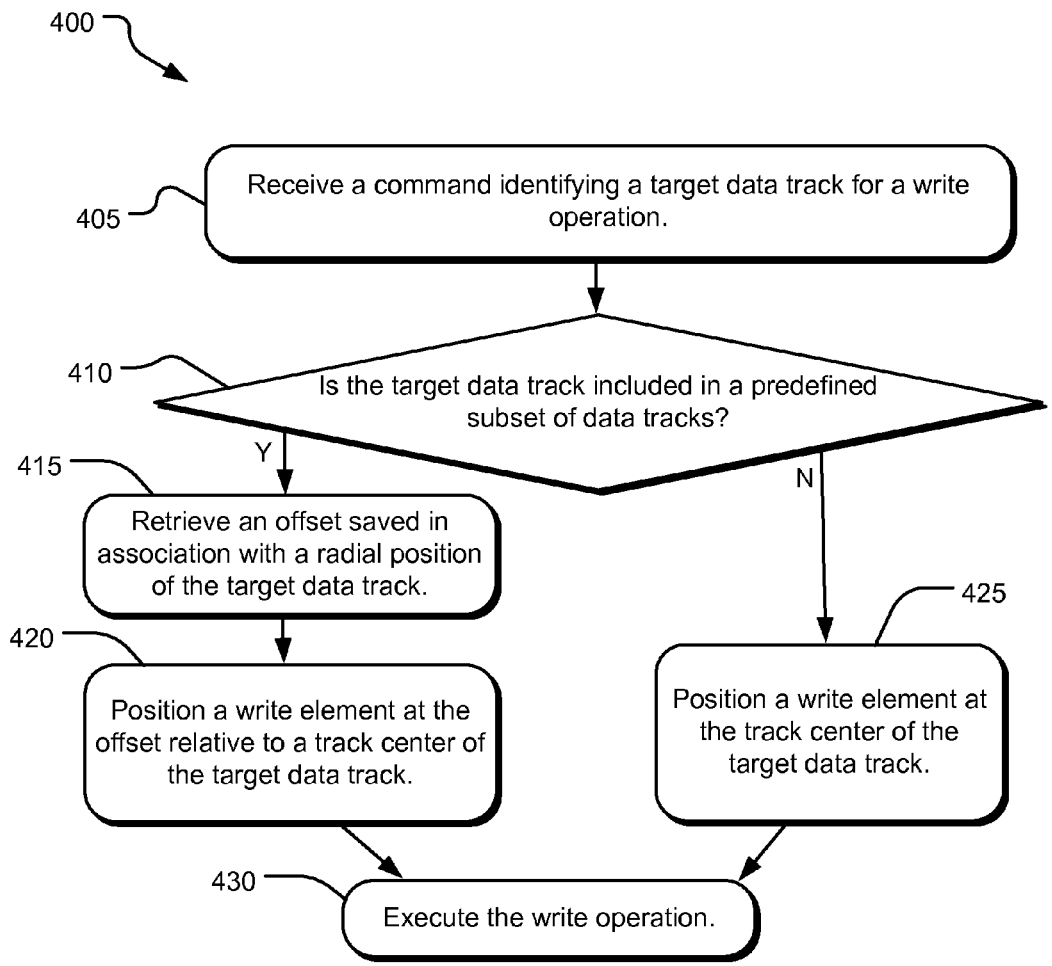
FIG. 4 illustrates example operations for increasing ATI uniformity across the surface of a storage medium.

FIG. 4 illustrates example operations for increasing ATI uniformity across the surface of a magnetic storage medium. A receiving operation 405 receives a command from a storage device controller that identifies a target data track for a write operation. A determination operation 410 determines whether the target data track is included in a predefined subset of data tracks. In one implementation, the predefined subset of data tracks includes a series of alternating data tracks on the storage medium such as tracks identified as "top" tracks in an IMR system.

If it is determined that the target data track is not included in the predefined subset of data tracks, a positioning operation 425 positions a write element at the track center of the target data track and an execution operation 430 executes the write operation by writing data to the target data track.

If, however, it is determined that the target data track is included in the predefined subset of data tracks, a retrieving operation 415 retrieves an offset saved in association with a radial position of the target data track. For example, the offset may be stored in a table of values including various offsets each corresponding to a different radial position of the write element. The offsets may vary in magnitude and direction.

In one implementation, the offset table is calculated during a factory calibration process. During the calibration process, each track in the predefined subset of tracks (e.g., each of the top tracks) is written to several and performance loss is observed on the directly adjacent data tracks. This is repeated for different offsets of the write head, and an offset is identified for each of the top data tracks that best equalizes the observed ATI degradation on the two directly adjacent data tracks. The offsets are saved in a table (e.g., a firmware table) in association with the corresponding data track and/or a radial position of the data track. A storage device controller may be configured to retrieve the offset from the firmware table responsive to receipt of a write command.

A positioning operation 420 positions a write element at the offset relative to a track center of the target data track, and an execution operation 430 executes the write operation by writing data to the target data track along a path defined by the offset position.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. An apparatus, comprising:
   a storage device controller configured to position a write head at an offset from a center of a target data track and write data to the target data track with the write head positioned at the offset, the offset selected based on a radial position of a write head at the target data track.

2. The apparatus of claim 1, wherein the offset is in a direction toward an inner diameter of a storage medium when the write head is at a first radial position and the offset is in an opposite direction when the write head is at a second radial position, the second radial position closer to an outer diameter of the storage medium than the first radial position.

3. The apparatus of claim 1, wherein the storage device controller is further configured to position the write head in alignment with the center of the target data track for the data write if the target data track is not included in a predefined subset of data tracks.

4. The apparatus of claim 1, wherein the storage device controller positions the write head at the offset from the center of the target data track exclusively when the target data track is included in a predefined subset of alternating data tracks on a storage medium.

5. The apparatus of claim 1, wherein the storage device controller is further configured to retrieve the offset from a firmware table.

6. The apparatus of claim 1, wherein the offset is of greater magnitude when a skew angle of the write head is larger than when the skew angle of the write head is smaller.

7. The apparatus of claim 1, wherein the target data track has a smaller written track width than either directly adjacent data track.

8. A method comprising:
positioning a write head at an offset from a center of a target data track; and
writing data to the target data track with the write head positioned at the offset, the offset selected based on a radial position of a write head at the target data track.

9. The method of claim 8, wherein the offset is in a direction toward an inner diameter of a storage medium when the write head is at a first radial position and the offset is in an opposite direction when the write head is at a second radial position, the second radial position closer to an outer diameter of the storage medium than the first radial position.

10. The method of claim 8, wherein the positioning operation is performed exclusively if the target data track is included in a predefined subset of tracks.

11. The method of claim 10, further comprising:
determining whether the target data track is included in a predefined subset of data tracks; and
if the target data track is not included in the predefined subset of data tracks, positioning the write head to align with the center of the target data track for the data write.

12. The method of claim 10, wherein the predefined subset of tracks includes alternating data tracks on a storage medium.

13. The method of claim 8, wherein the offset is of greater magnitude when a skew angle of the write head is larger than when a skew angle of the write head is smaller.

14. The method of claim 10, wherein the data track has a smaller written track width than either directly adjacent data track.

15. An apparatus comprising:
a storage device controller configured to write data to a first data track with a write head aligned with a center of the first data track, to write data to a second data track with the write head aligned with a center of the second data track, and to write data to a third data track with the write head positioned at a selected offset from a center of the third data track, the third data track between and directly adjacent to the first data track and the second data track.

16. The apparatus of claim 15, wherein the selected offset is selected based on a radial position of the write head at the third data track.

17. The apparatus of claim 15, wherein the selected offset is of greater magnitude when a skew angle of the write head is larger than when a skew angle of the write head is smaller.

18. The apparatus of claim 15, wherein the selected offset is in a direction toward an inner diameter of a storage medium when the write head is at a first radial position and the selected offset is in an opposite direction when the write head is at a second radial position, the second radial position closer to an outer diameter of the storage medium than the first radial position.

19. The apparatus of claim 15, wherein the third data track has a smaller written track width than either of the first data track or the second data track.

20. The apparatus of claim 15, wherein the storage device controller is further configured to retrieve the selected offset from a firmware table responsive to receipt of a command to write data to the third data track.

* * * * *